United States Patent [19]
de Fontenay

[11] Patent Number: 5,080,331
[45] Date of Patent: Jan. 14, 1992

[54] ELASTIC BUSHING EMPLOYING AN INERTIAL COLUMN OF DAMPING FLUID

[75] Inventor: Etienne de Fontenay, Decize, France

[73] Assignee: Caoutchouc Manufacture et Plastiques, S.A., Versailles, France

[21] Appl. No.: 506,331

[22] Filed: Apr. 9, 1990

[30] Foreign Application Priority Data

Apr. 10, 1989 [FR] France .................... 89 04790

[51] Int. Cl.⁵ .............................. F16F 13/00
[52] U.S. Cl. .................. 267/140.1 C; 180/312; 248/562; 248/636; 267/219
[58] Field of Search ............ 267/140.1 R, 140.1 C, 267/219, 220; 248/562, 636, 638; 180/300, 312, 902

[56] References Cited

U.S. PATENT DOCUMENTS

| | | | |
|---|---|---|---|
| 4,705,410 | 11/1987 | Broock | 267/219 X |
| 4,781,361 | 11/1988 | Makibayashi | 267/219 X |
| 4,893,799 | 1/1990 | de Fontenay | 248/562 X |
| 4,909,489 | 3/1990 | Doi | 267/140.1 C |

FOREIGN PATENT DOCUMENTS

| | | |
|---|---|---|
| 0040290 | 11/1981 | European Pat. Off. |
| 0115417 | 8/1984 | European Pat. Off. |
| 0119796 | 9/1984 | European Pat. Off. |
| 0150824 | 8/1985 | European Pat. Off. |
| 0154828 | 9/1986 | European Pat. Off. |
| 0242254 | 10/1987 | European Pat. Off. |
| 0248714 | 12/1987 | European Pat. Off. |
| 0277056 | 8/1988 | European Pat. Off. |
| 0278801 | 8/1988 | European Pat. Off. |
| 0286527 | 10/1988 | European Pat. Off. |
| 2467724 | 10/1979 | France |
| 2511105 | 9/1981 | France |
| 2555273 | 5/1983 | France |
| 2551161 | 3/1985 | France |
| 2575253 | 6/1986 | France |
| 2601098 | 1/1987 | France |
| 2599451 | 12/1987 | France |
| 2599452 | 12/1987 | France |
| 2600737 | 12/1987 | France |
| 2600738 | 12/1987 | France |
| 0304349 | 2/1989 | France |
| 0306369 | 3/1989 | France |
| 118133 | 5/1987 | Japan ............ 267/140.1 C |

OTHER PUBLICATIONS

SAE Technical Paper Series No. 86-1412, "Optimum Application for Hydroelastic Engine Mount", 9/22-25/1986.

Primary Examiner—George E. A. Halvosa
Attorney, Agent, or Firm—Thomas N. Ljungman

[57] ABSTRACT

Elastic bushing with hydraulic damping of radial elasticity by circulation of liquid between two chambers opposite one another connected by a very long annular passage located in the round exterior fastening armature. A rigidity decoupling, over a short stroke, is provided by the deformation of a thin wall in each chamber. One side of the thin wall has air thereagainst and the other side has a damping liquid thereagainst. On the air side of the thin wall, movement is limited by an internal fastening ring, and on the liquid damping side by contact with a comb integrated in said internal fastening ring. Application of the bushing is in the fields of mountings for an automobile engine and similar uses.

15 Claims, 3 Drawing Sheets

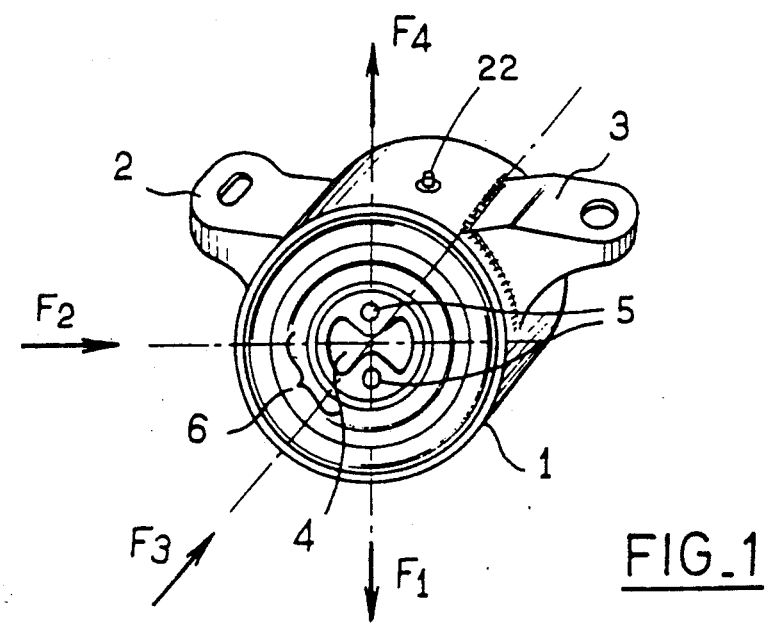
FIG_1
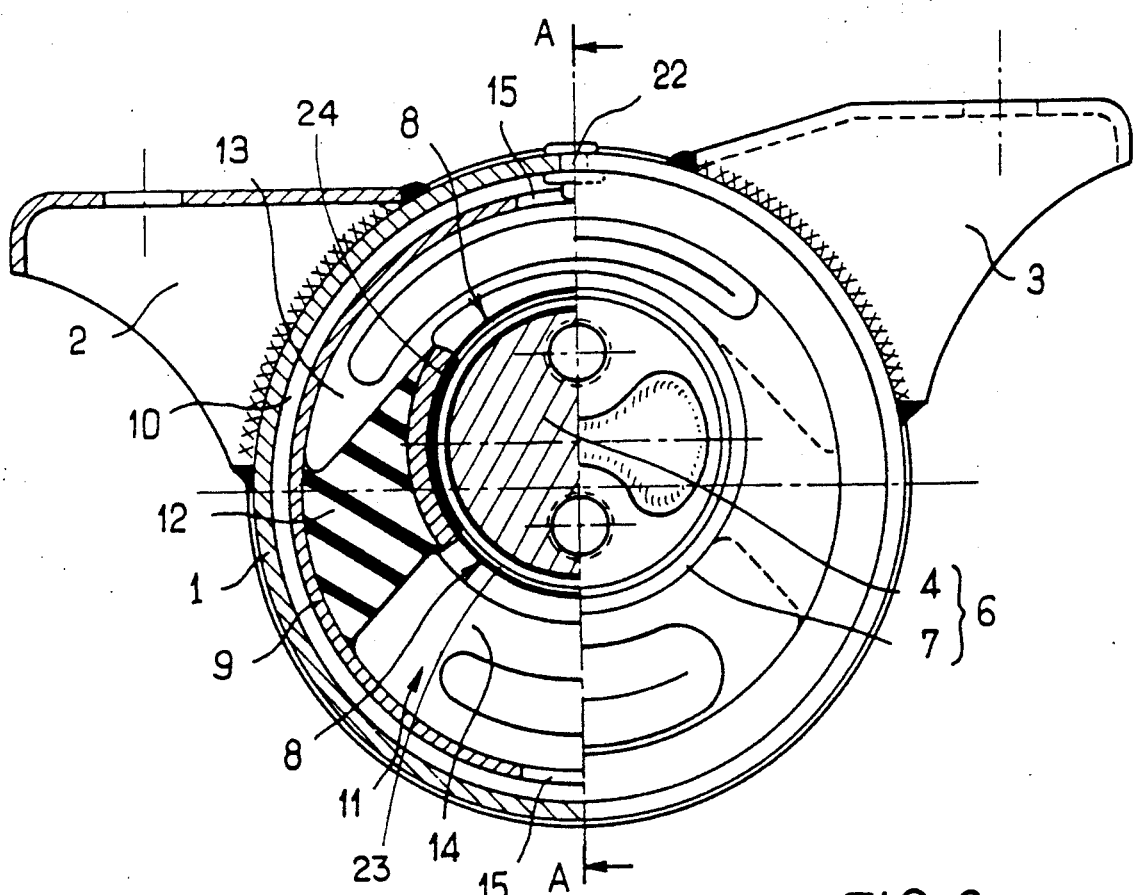
FIG_2

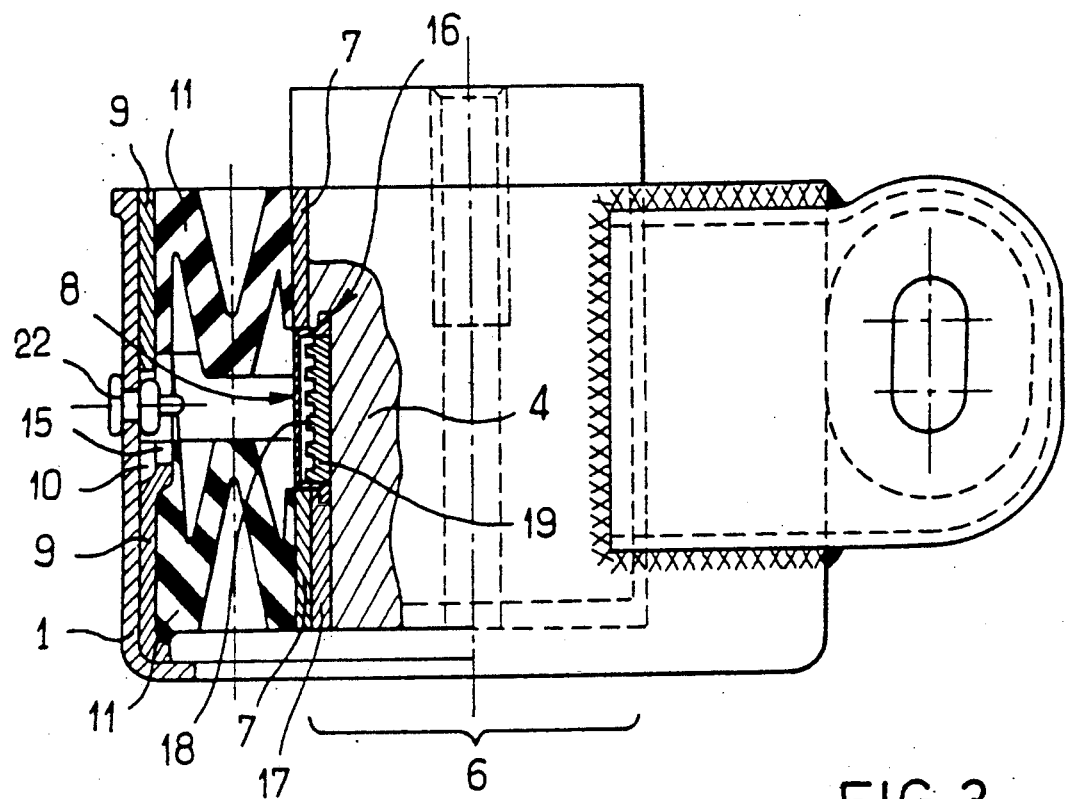
FIG_3
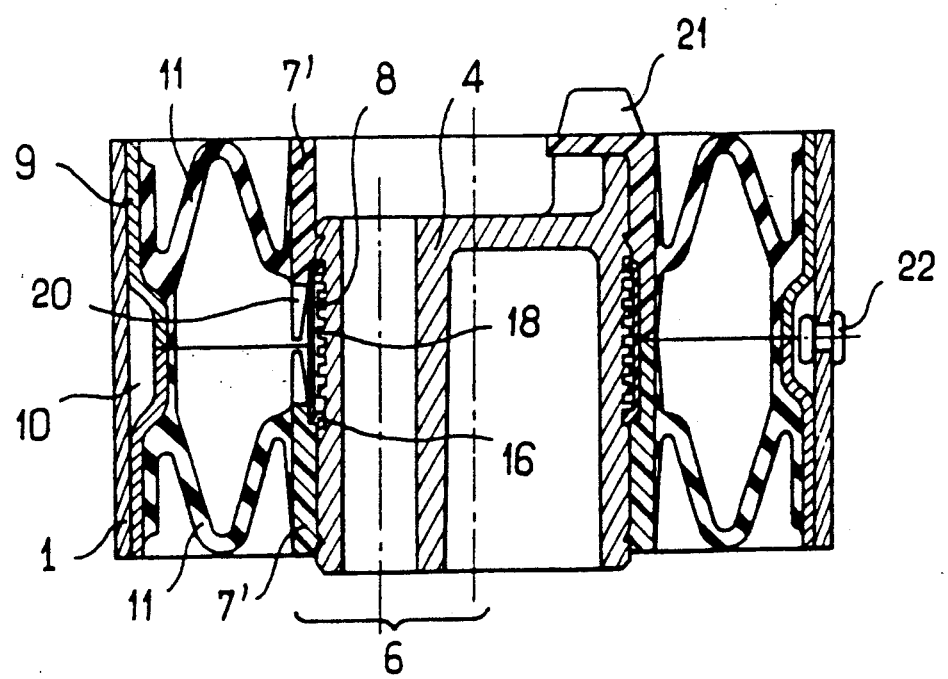
FIG_4

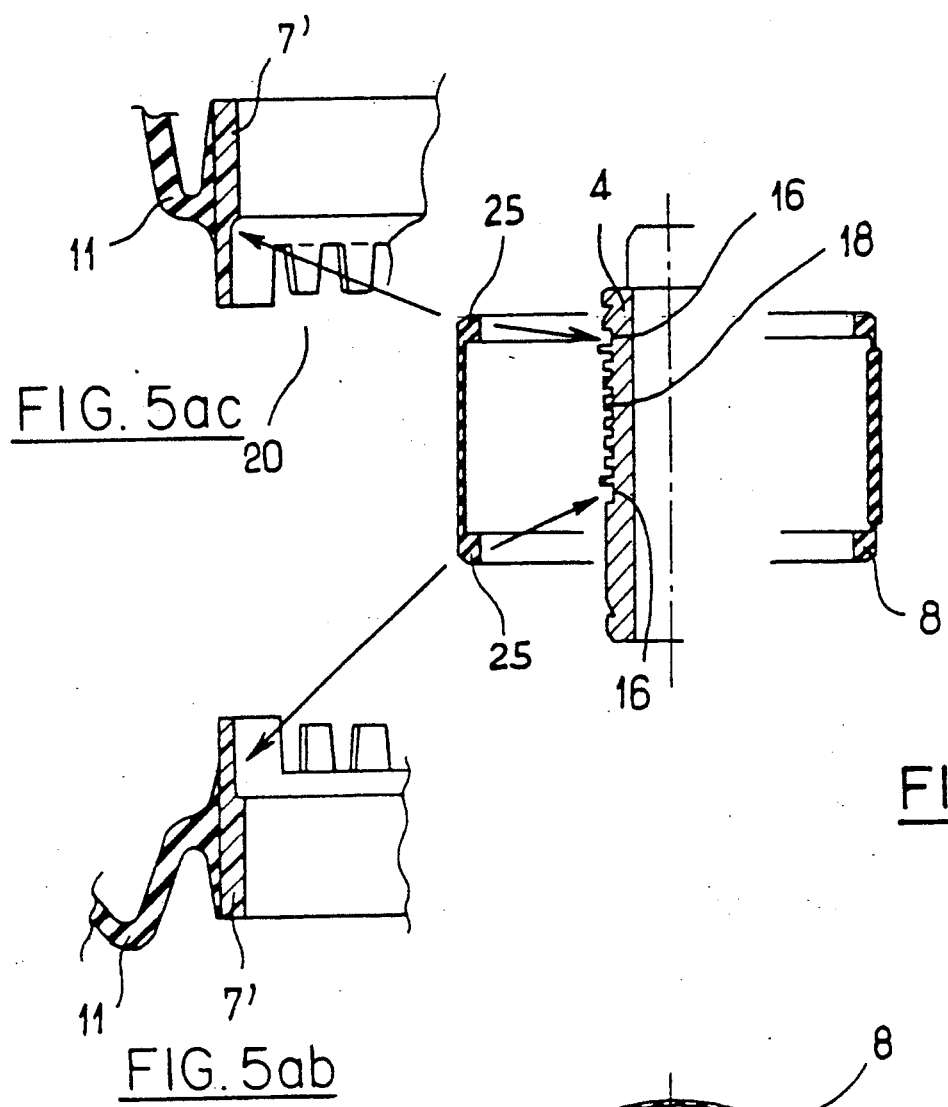
FIG. 5ac
FIG. 5ab
FIG. 5aa
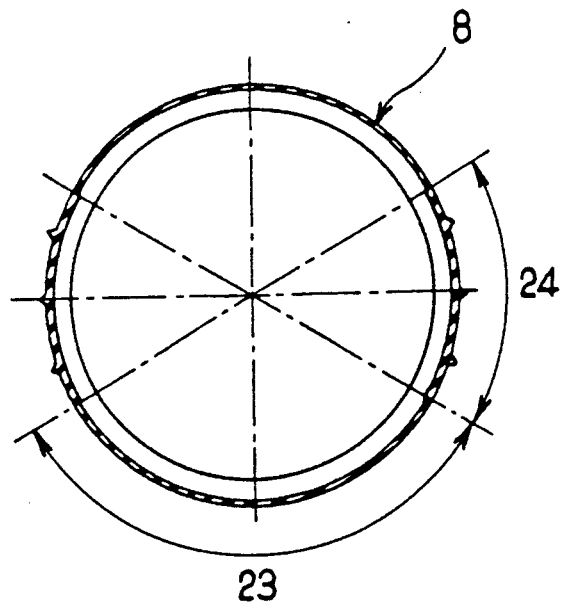
FIG. 5b

ELASTIC BUSHING EMPLOYING AN INERTIAL COLUMN OF DAMPING FLUID

BACKGROUND OF THE INVENTION

1. Field of the Invention

The present invention relates to vibration isolation devices for machines and, in particular, to elastic mountings for automobile engines or large truck cabins.

2. Background Information

More particularly, the present invention relates to the family of elastic supports realized by the association of elastomer walls and rigid rings, the shape of the assembly being essentially rotationally symmetrical. Such devices are frequently referred to as "elastic bushings", and their deformability is utilized in an essentially radial fashion. One primary purpose of such devices is to react to alternating forces in a direction perpendicular to their principal axis, while supporting a more or less high permanent load. In the principal direction of work (i.e., perpendicular to the principal axis of the device), a damping by hydraulic means is basically associated with the dynamic rigidity presented by such devices to different stresses.

A first type of elastic mounting, the rigidity of which is provided by elastomer pieces which provides integrated hydraulic damping of movements in the same direction as that of the load—the load being applied to the axis of the rotationally symmetrical parts—has recently undergone an evolution by the incorporation therein of a long inertial column of a non-viscous liquid. The resonant action of the column substantially increases the apparent rigidity of the device as soon as the alternating stresses exceed a certain range of frequencies.

An improvement of this principle consists of providing means for "decoupling" the rigidities of the system.

A highly resonant system, by definition, has a coefficient of transmission of accelerations resulting from alternating stresses which are much greater than 1.

"Rigidity decoupling", as that term is used herein, refers to a significant reduction of the apparent rigidity of the inertial device, over the very short strokes which usually characterize high-frequency vibrations. To do this, a short-stroke device is interposed in series with the apparent rigidity, in different forms, and acts in the same way as a low inertia.

The SAE Technical Paper Series No. 86-1412, entitled "Optimum Application for Hydroelastic Engine Mount", dated Sept. 22–25, 1986, presents a mathematical study to which a great number of known systems can be related. Additionally, such devices are disclosed in the following patents: French Patent Nos. 2,467,724 and 2,511,105 (Automobiles Peugeot), German Patent No. 3,019,337 (or European Patent No. 040,290) (Freudenberg).

A great number of improvements have been disclosed by rubber manufacturers, for example, those described in French Patent Nos. 2,599,451 and 2,599,452 (Freudenberg), European Patent No. 0,154,828 (Continental), French Patent Nos. 2,555,273, 2,575,253 (Hutchinson), European Patent Nos. 0,150,824 (Metzeler), 0,115,417 (Avon Industrial Polymers), 0,277,056 and 0,286,527 (Caoutchouc Manufacture et Plastiques, the present applicant) and European Patent No. 0,119,796 or U.S. Pat. No. 4,595,183 (Bridgestone Tire Company Ltd).

Another family of elastic bushings, disclosed, for example, in French Patent No. 2,551,161 (Tokay Rubber), with the improvements disclosed in French Patent Nos. 2,600,737, 2,600,738 and 2,601,098, employs configurations for damping radial elasticity. Similar constructions are disclosed in European Patent Nos. 0,242,254 and 0,248,714 (Hutchinson).

The devices referred to immediately above include two volumes of damping liquid enclosed by elastic lateral walls providing rigidity, and means for limiting the stroke of the radial elastic recall. The improvements relate to the circulation of the liquid between the two chambers by means of a principal passage, in which resonance prevents such circulation of fluid above a critical frequency. The improvements also relate to the incorporation of low-inertia valves which "decouple" this rigidity over a short stroke.

European Patent No. 0,278,801, issued to Caoutchouc Manufacture et Plastiques, discloses the simultaneous fitting of four tubes allowing the formation of chambers, a "resonant column" communication passage therebetween, and thin "decoupling" membranes. These terms may have become accepted usage in the pertinent field of art.

The devices disclosed in the above-referenced documents are usually quite complex in terms of design and manufacture. Many may require the molding of elastomer parts having complicated shapes and may require numerous assembly operations, such as successive fittings of complex parts.

As explained by the mathematical model referred to above, experimentation with designs intended to satisfy various specifications indicate that, once the two rigidities are regulated—one with a blocked volume for regulating high frequencies, and another with a circulating liquid for low regulating frequencies—the apparent damping is then at least partially determined by the dimensional ratios and by the length of the column of damping liquid. Aside from the density of the liquid, it should be noted that the mass of the resonant column connecting the two chambers acts in an inverse ratio of its cross section in relation to the equivalent cross section of a piston which would transfer the same volume of liquid under the action of eccentricity (the "eccentricity" being the relative displacement of the two mounting members of the device under the application of a force).

OBJECT OF THE INVENTION

One object of the present invention is to simplify the arrangements of the prior art by providing a minimum number of easily manufactured and assembled elements to obtain similar or improved results as compared to those achieved with the often complex devices of the prior art. A relatively long passage containing a resonant column is defined by a groove between rigid tubes, formed by the assembly of exterior rings and the elastic walls of two opposite chambers. In addition, a rigidity decoupling is provided by the low-amplitude deformation of thin walls (or "membranes"), located as close as possible to an internal ring inside the two chambers. For this purpose, the lowest or substantially lowest inertia is preferably obtained by the presence of air behind the membranes. The present inventor has discovered that significantly improved performance may be obtained by geometrically limiting the displacement of these membranes through the provision of a support in the form of grids on one side or the other of the membranes.

SUMMARY OF THE INVENTION

The present invention, therefore, relates to an elastic vibration isolation device comprising a bushing having deformable lateral walls, with hydraulic damping of the radial elasticity of the device being provided by the circulation of a liquid between two chambers, such as, an upper chamber and a lower chamber, through a very long annular passage formed in the periphery of a round exterior fastening armature. A rigidity decoupling, over a short stroke, is provided by the deformation of a membrane at least partially enclosing the chambers, the deformation being geometrically limited by contact with an internal fastening ring on the inside surface, bathed in air, and by contact with a comb integrated in the internal fastening ring, on the exterior surface, in contact with the damping liquid.

One aspect of the invention resides broadly in an elastic vibration isolation apparatus comprising: a first chamber, at least in part, an elastomeric wall portion and containing a hydraulic damping medium; a second chamber comprising, at least in part, an elastomeric wall portion; a substantially extended passageway interconnecting the first chamber and the second chamber which contains an inertial column of the hydraulic damping medium, having transverse dimensions and a length, the transverse dimensions of the inertial column of the damping fluid being substantially smaller than the length of the inertial column of the damping fluid; at least one flexible membrane being provided on the periphery of at least the first chamber; and restraining means positioned adjacent to and spaced from at least one surface of the at least one flexible membrane for at least partially substantially restraining deflection of the at least one flexible membrane beyond the restraining means.

BRIEF DESCRIPTION OF THE DRAWINGS

The invention will now be more fully disclosed by a detailed description of the preferred embodiments of the invention, reference being made to the accompanying drawings wherein:

FIG. 1 is a perspective view showing the axes of utilization of an elastic bushing of an embodiment of the present invention used as an engine mount for an automobile;

FIG. 2 is a partial cross section along a plane perpendicular to the principal axis $F_3$ of the elastic bushing of FIG. 1;

FIG. 3 is a partial cross section along a plane which passes through the principal axis $F_3$ of the elastic bushing of FIGS. 1 and 2;

FIG. 4 is also a partial section along a plane which passes through the principal axis $F_3$ of an alternative embodiment, which integrates a rigid comb member to further limit the stroke;

FIGS. 5aa, 5ab, 5ac are exploded views of the membrane of the embodiment of FIGS. 1, 2 and 3; and FIG. 5b is a cross-sectional view of the membrane taken along a plane perpendicular to the principal axis of the device.

DESCRIPTION OF THE PREFERRED EMBODIMENTS

FIG. 1 is a perspective view showing the different axes of utilization, $F_1$, $F_2$, $F_3$ and $F_4$, of an elastic bushing, constructed according to an embodiment of the invention and used as an engine mount of a truck or automobile engine, with a permanent load (e.g., the engine weight) applied in the direction indicated by the arrow $F_1$.

Such a permanent load, at rest, may preferably have a low value in relation to the dynamic variations caused by the absorption of torque, which dynamic variations typically alternate between the opposite directions $F_1$ and $F_4$. The perpendicular direction $F_2$ represents the direction transverse to the vehicle in which the specified radial rigidity need not necessarily be greatly damped, if at all. The same is preferably true for the longitudinal direction indicated by $F_3$, along which the axial rigidity of the elastic bushing is provided.

The elastic bushing is made up of a round exterior fastening armature 1 made of a metal tube welded to fastening lugs 2 and 3, which are preferably generally connected to elements of the frame by the use of bolts (not shown). The interconnection of the elastic bushing to the motor which is typically suspended by the elastic bushing, is preferably accomplished by the provision of a massive ring 4, e.g., preferably made from aluminum alloy, which is pierced by fastening holes 5 and which has sections cut out to reduce its weight, as required. On the massive ring 4 are fitted the various elements constituting an internal fixing ring assembly 6.

FIG. 2 is a partial cross-section taken along a plane perpendicular to the principal axis $F_3$ of the elastic bushing of FIG. 1. The round exterior fastening armature 1, with the fastening lugs 2 and 3, which are preferably welded to the exterior fastening armature 1, constitutes an assembly which is then, preferably, protected against oxidation in the customary manner for armatures made of sheet steel (e.g., by coating). The massive ring 4 is also seen in the partial section of FIG. 2, along with a half-ring 7, fitted over the massive ring 4 during assembly to constitute the internal fixing ring assembly 6. As discussed more fully below, two half-rings 7 are preferably employed in the present invention. Each half-ring 7 extends over only a portion of the length of the elastic bushing along its principal axis $F_3$. Additionally, the two half-rings 7 may be preferably inserted over the massive ring 4 from the opposite ends of the cylinder forming the device. Also, visible in the cross-section is a membrane 8, which has two portions 23 and 24, each having two oppositely positioned segments. Portions 24, being relatively thick in transverse dimension, are provided for the spacing of the two thinner portions 23 away from the surface of the assembly 6. Assembly 6 is surrounded by an exterior half-ring 9 which is fitted during assembly in the round exterior fastening armature 1. As seen in FIG. 2, and even more clearly in FIG. 5b, membrane 8 has portions 23 which are relatively thin in transverse dimension and portions 24 which are relatively thick in transverse dimension. In the plane of the cross-section, the fitted surfaces create an annular passage 10, though which a resonant column of damping liquid circulates. The half-rings 7, which are provided with slots creating windows exposing the membrane 8, and the exterior half-ring 9 are preferably intimately bonded (or "vulcanized") during fabrication by an elastic lateral wall 11 (shown in both FIGS. 2 and 3).

The cross-section of FIG. 2 also shows a separation partition 12, seen at the side of the cross-section, which is preferably formed integrally with the lateral wall 11.

A seal between a top chamber 13 and a bottom chamber 14 is created, during the fitting, by the reciprocal contact of two partial portions of the separation partitions 12. On the other hand, a communication, with an open cross-section but with a high inertia (due to the mass of the liquid damping medium contained therein), is provided between the two chambers by means of the annular passage 10, through the provision of two communication holes 15 provided in the exterior half-ring 9.

FIG. 3 shows the operation of the hydraulic damping integrated into the elastic bushing. FIG. 3 is a partial section along a vertical plane A (shown in FIG. 2), passing through the principal axis $F_3$ of the device. After a static deflection (e.g. by 2 to 3 millimeters) of the lateral walls 11, which are preferably fabricated eccentrically as regards the principal axis of the device, and preferably of the separation partitions 12, which are preferably formed integrally with the lateral walls 11, the internal fastening ring 6 and the round exterior fastening armature 1 preferably become essentially concentric. This initial deformation in the $F_1$–$F_4$ direction is primarily due to the weight of the supported structure (e.g., the motor).

The sectional views of FIGS. 3 and 4 show how the two exterior half-rings 9, may be locally hammered out (or deformed inwardly) over several millimeters on either side of the median plane, so as to form the annular passage 10 between the two exterior half-rings 9 and the round exterior fastening armature 1. Either with one half-ring overlapping the other (as shown in FIG. 3) or with both half-rings 9 having inwardly deflected segments over a portion of their length (as shown in FIG. 4), the exterior half-rings 9 can be assembled such that they come into edgewise contact one against the other. The seal obtained by the edgewise contact between steel sheets end-to-end is not perfect and can have an effect on the circulation of the liquid in the annular passage 10, the effect thus being to expand, in frequency, the resonant system. This effect may be desirable in certain applications.

Along the same lines, the seal provided by the reciprocal contact between the partial separation partitions 12 may have a limit, as regards pressure. In the case of an impact, a separation of the contact therebetween may occur, thereby allowing some additional fluid communication between the two chambers.

For normal usage, the simplest arrangement is to put the two lateral semi-circles of the annular passage 10 in communication with each of the chambers by providing the two communication holes 15, one provided on the top and one provided on the bottom of the half-rings 9, thereby preferably making two symmetrical resonant column flows which preferably circulate in parallel. In an alternative embodiment (not illustrated), a longer, single column can be obtained by locally blocking the annular passage 10 during the molding of the elastomer of the lateral walls 11, whereby the communication holes 15 are offset, to get, thereby, a passage length on the order of three-quarters of the circumference.

The cross-section of FIG. 3 shows how the internal half-rings 7, preferably simple tubes of sheet steel bonded (or vulcanized) to each lateral wall 11, are preferably fitted over a single diameter. A recessed cylindrical portion 16 is preferably machined in the massive ring 4. The membrane 4 is slipped over massive ring 4 so as to encircle massive ring 4, and the edge of one end of the membrane 8 is secured by slipping a preferably plastic ring 19 over massive ring 4. A retaining ring 17 is then slipped over massive ring 4 to secure the opposite edge of the membrane 8. Finally, the two half-rings 7 are applied, so as to form the internal ring assembly 6 preferably having a uniform external diameter over its length.

In areas where the membrane 8 is not intended to radially deflect, a hydraulic seal between the top chamber 13 and the bottom chamber 14 is preferably realized by providing a seal within the annular space formed between the internal half-rings 7 and the massive ring 4. Preferably, this is accomplished by thickening the membrane 8 in these areas and by compressing the membrane 8 within these areas between these rings.

The membrane 8 is preferably provided with a circumferential reinforcement of textile cords, so as to prevent an excessive barrelling towards the side of the membrane 8 where the hydraulic pressure is decreased. This reinforcement with textile cords, preferably anchored by means of a locally increased thickness of the membrane 8 over approximately two opposite quarters of the circumference (as shown in FIG. 5b), preferably does not interfere with the compression on the side of the membrane 8 where the hydraulic pressure increases.

As seen in FIG. 3, the radial geometric displacement of membrane 8 is limited, in the direction towards the interior of the elastic bushing, preferably to less than one millimeter, and even more preferably to 0.5 millimeter or less, by its contact against provided circular grooves 18. Preferably, the circular grooves 18 are formed in the plastic ring 19, which encircles the massive ring 4 adjacent the retainer ring 17. The lateral edges of the membrane 8 are, as is shown in FIG. 3, preferably sealed and maintained in position by being pinched between, as regards one edge, the plastic ring 19 and the massive ring 4; and between, as regards the other edge, the massive ring 4 and the retaining ring 17. A minimum deformation of the volumes providing the rigidity decoupling is allowed by circulation of the enclosed air between the top and bottom chambers 13 and 14, via the circular grooves 18.

This space (i.e., the volume of circular grooves 18) preferably retains an essentially constant volume, but it is nevertheless desirable for it to remain filled substantially soley with air, in order to reduce the vibratory inertia of the membrane 8, the parasitic resonance of which could be pushed back to several hundred Hertz, namely, beyond the ranges of the frequencies to be filtered. Leaks of liquid in this small space, after fitting or during fitting, since their mass would then be added to that of the membrane 8, would result in a mechanical resonance (closer to 100–200 Hertz), which would most likely turn out to be of a parasitic effect upon the vibratory isolation. By means of this preferable matched movement of the two active portions of membrane 8, the vibratory isolation is preferably properly filtered over a short stroke, without the intervention of the circulation of the damping liquid through the annular passage 10.

FIG. 4 is a cross-section of an alternative embodiment of mounting the membrane 8 so as to perform the function of rigidity decoupling.

In the alternative embodiment of FIG. 4, in order to satisfy the requirement for the lowest possible dynamic mass, the thin wall 8 is fabricated, preferably without reinforcement, as an elastomer membrane having preferably the lowest acceptable weight. The membrane 8 is in contact, during radial deformation in the direction of the axis $F_1$, with an exterior surface having circular grooves 18 formed, in this alternative embodiment, directly in the massive ring 4. The massive ring 4 preferably has a single outside diameter, over which are fitted two rigid, preferably substantially identical, internal half-rings 7′, the material of which is preferably intimately bonded (or vulcanized) to the lateral walls 11. Each of the internal half-rings 7′ is provided with an integral comb-shaped extension 20 having teeth which project substantially parallel to the principal axis $F_3$ of the elastic bushing.

Such an arrangement makes possible the manufacture of the internal half-rings 7′ by molding, for example, using aluminum alloy, or thermoplastic or thermosetting materials, either homogeneous or reinforced with short fibers. The teeth of the comb-shaped extension 20, oriented face-to-face, and either being in contact with one another or not (i.e., either being separated by a short distance or staggered), limit the radial deformation of the membrane 8 in the direction of the hydraulic chambers (i.e., away from the central axis $F_3$ of the device) preferably to a distance of one millimeter or less, and even more preferably to a distance of 0.5 millimeter or less when, at high frequency, the liquid is compressed. Without significant circulation of the liquid in the resonant column in the annular passage 10, the periodic vibrations modify the eccentricity between the internal fastening ring 6 and the round external fastening armature 1, and cause a displacement of substantially all the liquid contained in the elastic bushing by a very small amplitude.

The stopping action should start to be felt beyond 0.1 mm of eccentricity. In order that there be a significant damping, that is with a tangent $\phi$ greater than 1 in the desired frequency ranges, it is usually necessary for the deflections of the membrane 8 to be substantially rigidly limited, in order that there will be an alternating pressure differential between the opposite chambers, which forces the resonant column to move. The amplitudes should theoretically be in the ratio of its cross section to that of an imaginary equivalent piston, which would transfer the liquid from one chamber to the other under the effect of the eccentricity. The deformability of the lateral walls 11 may be parasitic in this movement, which is explained by the fact that the resonance of the equivalent mass-spring system is not as precise and limited in frequencies as that of a solid-spring system. The orders of magnitude observed are approximately twice the rigidity of eccentricity, with a blocked column, in relation to the rigidity at low speed allowing the circulation of the liquid.

The complex shape of the lateral walls 11 and the thickness of the separation partitions 12, which are integral parts of the lateral walls 11, are selected to satisfy the requirements of transversal and axial rigidities in directions $F_2$ and $F_3$ as shown in FIG. 1, as set by the requirements for a particular application. Since they are produced without a transfer of liquid between the two chambers, these rigidities are not a significant consideration of the hydraulic damping of the displacements along the axis $F_1-F_4$. The progressive stroke limitation is also provided by this shape of the lateral walls 11, since each wave ends beyond the low rigidity stroke both statically and at oscillating low frequency. This radial effect is exercised both in the vertical direction and in the transverse direction. Stops 21 (shown in FIG. 4) projecting from the plane surface can perform the same function in the axial direction of the elastic bushing, if necessary, by coming in contact with a facing rigid wall (provided, for example, on the vehicle frame).

FIGS. 5aa, 5ab, 5ac are axial sections of the membrane 8 showing exploded views of its cooperating elements. FIG. 5b is an elevation view of the membrane 8. The membrane 8 preferably is in the form of a ring and preferably consists of two portions of reduced thickness 23 which form rectangular windows on the top and on the bottom of the device, joined by areas of preferably increased thickness 24 over preferably two diametrically opposite zones of the circumference. The areas of increased thickness 24 serve to space the areas of reduced thickness 23 of the membrane 8 away (e.g., at a distance of up to about 1 millimeter) from the surface of the central assembly 6, and also preferably provide a seal for preventing the flow of the liquid damping medium between the top and bottom chambers, by being clamped between the massive ring 4 which is inside the membrane 8, and the internal half-rings 7 which surround the membrane 8.

On each lateral edge, each of the portions 23 of membrane 8 has flanges 25, the shapes of which preferably match those of provided annular grooves 16, in which the lateral seal is achieved, under the action of the fitting of the internal half-rings 7′, as shown in FIGS. 4 and 5aa–ac.

The two annular grooves 16 are preferably located on opposite sides of the circular grooves 18, where the preferably vary small volume of air enclosed by the membrane 8 circulates under the action of the alternating eccentricity (i.e., the vibrational displacements).

One preferred process for the fabrication of an elastic bushing according to the invention does not require any substantial modification of the techniques customarily used by rubber products manufacturers. The two half-rings joined by the lateral walls 11, and each integrating one-half of the two separation partitions 12, are fabricated by a molding which simultaneously ensures a vulcanization of the elastomer compound and an intimate bonding, by adhesion to the rigid elements.

Each lateral wall 11 and its integral partial separation partition 12 is, therefore, permanently fastened to an exterior half-ring 9 and an internal half-ring 7 preferably made of steel tubing, or else internal half-ring 7′ of aluminum alloy or even thermoplastic or thermosetting materials, the latter two possibly being reinforced with short fibers, such as glass fiber, to cite one non-restricting example.

The membrane 8 is preferably produced by an independent molding of an elastomer compound, reinforced, if necessary, by a layer of textile cords which, to cite one non-restricting example, can be laid by filament winding over an internal core.

The installation of the membrane 8 is preferably done by successive fittings on a press, of an internal half-ring 7 or 7′ equipped, as described, with said lateral walls 11, on the massive ring 4, enclosing the membrane 8 between the circular recessed portion 16 and the retaining ring 17 or the internal half-rings 7′. The internal fastening ring 6, thus produced, preferably functions as a single solid unit. The two exterior half-rings 9, are then elastically connected to this solid unit, by means of the lateral walls 11, and are then fitted, in a sealed manner, within the round exterior fastening armature 1, provided with fastening lugs 2 and 3.

A seal is preferably provided, on this latter assembly, by an elastomer film on the outside diameter of the exterior half-rings 9. The same is true on the inside diameter of the internal half-rings 7. It has been explained why a rigorous seal is not necessary between these exterior half-rings 9, in the zones where they are in edgewise contact to form the liquid column in the circular passage 10, enclosed between the exterior half-rings 9 and the interior surface of the round exterior fastening armature 1.

The filling with a damping liquid, preferably a mixture of water and antifreeze appropriate to the particular application, is preferably done by vacuum, by means of a hole pierced in the round exterior fastening armature 1, followed by the introduction of the damping liquid and the closing of the hole by means of a sealed rivet 22 (shown in FIGS. 1-4).

This elastic mounting can, thereby, be manufactured by known processes, can thus be mass produced, and has the following advantages:

Due to its simplicity of construction, it is usually not heavier than the devices of the prior art, and performs the same elastic functions in all three directions, with the necessary progressive stroke limitations.

In the principal direction of damping supporting the large alternating forces, the present invention preferably contributes a highly effective damping of the viscous-elastic type, for $\frac{1}{2}$ tangent $\phi$ between 0.5 and 1 in a low frequency zone. The mounting is thus preferably capable of absorbing the undesirable phenomenon referred to as vertical "chopping" of the engine and alternating absorption of torque called "re-coupling", by means of a good damping attaining preferably about 0.8 at these frequency values.

In addition, in spite of this very effective monodirectional damping, the mounting preferably has an undamped resilience, and consequently has a good filtering action at frequencies higher than 20 or 25 Hertz, as is required of elastic mountings, to properly filter the vibrations emitted by the motor in the audible frequency range.

The mounting, preferably, is completely interchangeable with the devices currently used in similar fields of application.

The mounting may be mass produced in an economical fashion, by means which are conventional in the rubber goods manufacture industry, by the assembly of simplified parts which have a rotational symmetry.

The realization technique thus offers manufacturers a particularly economical compromise to satisfy the often contradictory requirements imposed on the elastic mountings of engines, or for similar needs.

In summary, one feature of the invention resides broadly in an elastic vibration isolation device consisting of a bushing with deformable lateral walls 11 with hydraulic damping of the radial elasticity by circulation of liquid between two, a top 13 and a bottom 14 chamber, via a very long annular passage 10 left open in the periphery of a round exterior fastening armature 1, having rigidity decoupling means over a short stroke, provided by the deformation of a thin wall 8 enclosing each of said chambers, a deformation geometrically limited by contact with the internal fastening ring 6 on the inside surface of said thin wall 8, bathed in air, and characterized by the fact that the thin wall 8 comes in contact with a comb 20 integrated in said internal fastening ring 6, on its outside surface, in contact with the damping liquid.

Another feature of the invention resides broadly in an elastic vibration isolation device constituted by a bushing with deformable lateral walls 11 which is characterized by the fact that the comb 20 limiting the expansion of the thin wall 8 toward the damping liquid is realized of textile cords oriented circumferentially and intimately bonded to said thin wall 8.

Yet another feature of the invention resides broadly in an elastic vibration isolation device constituted by a bushing with deformable lateral walls 11 which is characterized by the fact that the comb 20, limiting the expansion of the thin wall 8 toward the damping liquid is rigid, made of metal or plastic, and is an integral part of two internal half-rings 7', adhering to each lateral wall 11, forming the internal fastening ring 6.

A further feature of the invention resides broadly in an elastic vibration isolation device constituted by a bushing with deformable lateral walls 11 which characterized by the fact that the teeth of the comb 20 are oriented parallel to the axis of the bushing which bushing has deformable lateral walls 11.

A yet further feature of the invention resides broadly in an elastic vibration isolation device constituted by a bushing with deformable lateral walls 11 which is characterized by the fact that the seal between the top 13 and bottom 14 chambers, provided by the reciprocal contact of two separation partitions 12 which are integral parts of said lateral walls 11, is limited in pressure by their detachment, which allows communication between said chambers in case of impact.

All, or substantially all, of the components and methods of the various embodiments may be used with at least one embodiment or all of the embodiments, if any, described herein.

All of the parents, patent applications and equivalents and corresponding patents and patent applications published or issued by other patent offices, and publications recited herein, if any, are hereby incorporated by reference as if set forth in their entirety herein.

The details in the patents, patent applications, and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. An elastic vibration isolation apparatus, said elastic vibration isolation apparatus comprising: a first chamber, said first chamber comprising, at least in part, an elastomeric wall portion, said first chamber containing a hydraulic damping medium, and said first chamber being substantially bounded by a first peripheral wall portion substantially defining said first chamber;

a second chamber, said second chamber comprising, at least in part, an elastomeric wall portion, and said second chamber being substantially bounded by a second peripheral wall portion substantially defining said second chamber;

a substantially extended passageway interconnecting said first chamber and said second chamber, said substantially extended passageway containing an inertial column of said hydraulic damping medium, said substantially extended passageway having transverse dimensions and a length, the transverse dimensions of said inertial column of said damping medium being substantially smaller than the length of said inertial column of said damping medium;

at least one flexible membrane;

restraining means positioned adjacent to and spaced from at least one surface of said at least one flexible membrane for at least partially substantially restraining deflection of said at least one flexible membrane beyond said restraining means;

wherein said second chamber also contains said hydraulic damping medium, wherein said at least one flexible membrane comprises a first flexible membrane provided on said first peripheral wall portion of said first chamber and a second flexible membrane provided on said second peripheral wall portion of said second chamber, wherein each of said first and second membranes has a first surface, and wherein said restraining means comprises a first restraining member positioned adjacent to and spaced from said first surface of said first flexible membrane and a second restraining member positioned adjacent to and spaced from said first surface of said second membrane;

wherein said first membrane has a second surface substantially opposed to said first surface of said first membrane, wherein said second membrane has a second surface substantially opposed to said first surface of said second membrane, and wherein said elastic vibration isolation apparatus additionally comprises a substantially enclosed channel extending from said second surface of said first flexible membrane to said second surface of said second flexible membrane, said substantially enclosed channel containing a gas;

wherein said substantially enclosed channel is substantially filled with the gas, and wherein the gas comprises air;

wherein said elastic vibration isolation apparatus is for attachment to two portions of a device, and wherein said elastic vibration isolation apparatus additionally comprises:

a central attachment member for being attached to a first of the two portions of the device;

said central attachment member having a substantially cylindrical exterior surface;

a first tube member encircling said central attachment member and spaced from said substantially cylindrical exterior surface of said central attachment member to thereby provide a first substantially annular space;

a second tube member encircling said first tube member and spaced from said first tube member to thereby provide a second substantially annular space;

partition means for dividing said second substantially annular space into said first chamber and said second chamber;

a third tube member encircling said second tube member and spaced from said second tube member thereby to provide a third substantially annular space;

said third tube member being for attachment to the second of the two portions of the device;

said first annular space comprising said substantially enclosed channel containing the gas;

said second annular space containing said hydraulic damping medium; and said third annular space comprising said substantially extended passageway containing said inertial column of said hydraulic damping medium;

said apparatus additionally comprising at least two orifices formed in said second tube member, a first of said at least two orifices communicating with said first chamber and the second of said at least two orifices communicating with said second chamber, a first opening formed in said first tube member and a second opening formed in said first tube member, and wherein said first flexible membrane extends over said first opening formed in said first tube member and said second flexible membrane extends over said second opening formed in said first tube member;

wherein said first restraining member and said second restraining member comprise surface portions of said central attachment member, and wherein said first membrane extending over said first opening formed in said first tube member and said second membrane extending over said second opening formed in said first tube member are both, in an unflexed state, substantially spaced from said surface portions of said central attachment member;

wherein said first and second restraining members which comprise surface portions of said central attachment member each comprise a plurality of separate and discrete projecting surfaces spaced from one another, said separate and discrete projecting surfaces projecting outwardly from said central attachment member towards said first and second membranes, said separate and discrete projecting surfaces being spaced from one another by inwardly projecting recesses.

2. The elastic vibration isolation apparatus according to claim 1, wherein said plurality of separate and discrete surfaces spaced one from another comprise raised cylindrical plateaus formed and separated by grooves provided in said substantially cylindrical surface of said central attachment member.

3. The elastic vibration isolation apparatus according to claim 1, wherein said elastic vibration isolation apparatus comprises a third restraining member which is spaced radially outward from said first membrane, is within said first chamber, is in contact with said hydraulic damping medium and comprises a first plurality of separate and discrete projecting surfaces spaced one from another, and a fourth restraining member which is spaced radially outward from said second membrane, is within said second chamber, is in contact with said hydraulic damping medium and comprises a second plurality of separate and discrete projecting surfaces spaced one from another.

4. The elastic vibration isolation apparatus according to claim 3, wherein said third restraining member additionally comprises a first substantially rigid comb-shaped member having said first plurality of separate and discrete projecting surfaces spaced one from another, and wherein said fourth restraining member comprises a second substantially rigid comb-shaped member having said second plurality of separate and discrete projecting surfaces spaced one from another.

5. The elastic vibration isolation apparatus according to claim 4, wherein said first tube member comprises at least two separate partial tube members, said at least two separate partial tube members being axially aligned to form said first tube member, wherein said first substantially rigid comb-shaped member is formed integrally with a first of said at least two separate partial tube members, and wherein said second substantially rigid comb-shaped member is formed integrally with the second of said at least two separate partial tube members.

6. The elastic vibration isolation apparatus according to claim 5, wherein each of said first substantially rigid comb-shaped member and said second substantially rigid comb-shaped member comprise spaced tines extending parallel to the principal axis of said first tube member.

7. The elastic vibration isolation apparatus according to claim 6, wherein said tines of said first substantially rigid comb-shaped member and said tines of said second substantially rigid comb-shaped member each comprise at least one of a metal and a plastic.

8. The elastic vibration isolation apparatus according to claim 7, wherein each of said first flexible membrane and said second flexible membrane comprise textile cords extending circumferentially with respect to said substantially cylindrical exterior surface of said central attachment member, said textile cords being intimately bonded to each of said first flexible membrane and said second flexible membrane;

wherein each of said first tube member, said second tube member and said third tube member have a first end and a second end, wherein said elastic vibration isolation apparatus additionally comprises a first end wall of an elastomeric material connecting said first ends of said first and second tube members, wherein said elastic vibration isolation apparatus additionally comprises a second end wall of an elastomeric material connecting said second ends of said first and second tube members, and wherein said partition means comprises a first pair of partition members formed integrally with said first end wall and extending only partially along the axial length of said elastic vibration isolation apparatus and a second pair of partition members formed integrally with said second end wall and extending only partially along the axial length of said vibration isolation apparatus, said first pair of partition members and said second pair of partition members abutting one another, whereby substantial impact to said elastic vibration isolation apparatus can cause separation of said abutment between said first pair of partition members and said second pair of partition members and at least a partial flow of the hydraulic damping medium therebetween; and wherein said first flexible membrane and said second flexible membrane each comprise portions of an annular elastomeric structure, said annular elastomeric structure being disposed circumferentially about said substantially cylindrical exterior surface of said central attachment member.

9. The elastic vibration isolation apparatus according to claim 1, wherein said restraining means additionally comprises a first substantially rigid comb-shaped member having an additional plurality of separate and discrete projecting surfaces spaced one from another, and wherein said restraining means additionally comprises a second substantially rigid comb-shaped member having an additional plurality of separate and discrete projecting surfaces spaced one from another.

10. The elastic vibration isolation apparatus according to claim 9, wherein said first tube member comprises at least two separate partial tube members, said at least two separate partial tube members being axially aligned to form said first tube member, wherein said first substantially rigid comb-shaped member is formed integrally with a first of said at least two separate partial tube members, and wherein said second substantially rigid comb-shaped member is formed integrally with the second of said at least two separate partial tube members.

11. The elastic vibration isolation apparatus according to claim 10, wherein each of said first substantially rigid comb-shaped member and said second substantially rigid comb-shaped member comprises spaced tines extending parallel to the principal axis of said first tube member.

12. The elastic vibration isolation apparatus according to claim 11, wherein said tines of said first substantially rigid comb-shaped member and said tines of said second substantially rigid comb-shaped member each comprise at least one of a metal and a plastic.

13. The elastic vibration isolation apparatus according to claim 12, wherein each of said first flexible membrane and said second flexible membrane comprise textile cords extending circumferentially with respect to said substantially cylindrical exterior surface of said central attachment member, said textile cords being intimately bonded to each of said first flexible membrane and said second flexible membrane;

wherein each of said first tube member, said second tube member and said third tube member have a first end and a second end, wherein said elastic vibration isolation apparatus additionally comprises a first end wall of an elastomeric material connecting said first ends of said first and second tube members, wherein said elastic vibration isolation apparatus additionally comprises a second end wall of an elastomeric material connecting said second ends of said first and second tube members, and wherein said partition means comprises a first pair of partition members formed integrally with said first end wall and extending only partially along the axial length of said elastic vibration isolation apparatus and a second pair of partition members formed integrally with said second end wall and extending only partially along the axial length of said vibration isolation apparatus, said first pair of partition members and said second pair of partition members abutting one another, whereby substantial impact to said elastic vibration isolation apparatus can cause separation of said abutment between said first pair of partition members and said second pair of partition members and at least a partial flow of the hydraulic damping medium therebetween; and wherein said first flexible membrane and said second flexible membrane each comprise portions of an annular elastomeric structure, said annular elastomeric structure being disposed circumferentially about said substantially cylindrical exterior surface of said central attachment member.

14. The elastic vibration isolation apparatus according to claim 1, wherein each of said first flexible membrane and said second flexible membrane comprise textile cords extending circumferentially with respect to said substantially cylindrical exterior surface of said central attachment member, said textile cords being intimately bonded to each of said first flexible membrane and said second flexible membrane;

wherein each of said first tube member, said second tube member and said third tube member have a first end and a second end, wherein said elastic vibration isolation apparatus additionally comprises a first end wall of an elastomeric material connecting said first ends of said first and second tube members, wherein said elastic vibration isolation apparatus additionally comprises a second end wall of an elastomeric material connecting said second ends of said first and second tube members, and wherein said partition means comprises a first pair of partition members formed integrally with said first end wall and extending only partially along the axial length of said elastic vibration isolation apparatus and a second pair of partition members formed integrally with said second end wall and extending only partially along the axial length of said vibration isolation apparatus, said first pair of partition members and said second pair of partition members abutting one another, whereby substantial impact to said elastic vibration isolation apparatus can cause separation of said abutment between said first pair of partition members and said second pair of partition members and at least a partial flow of the hydraulic damping medium therebetween; and wherein said first flexible membrane and said second flexible membrane each comprise portions of an annular elastomeric structure, said annular elastomeric structure being disposed circumferentially about said substantially cylindrical exterior surface of said central attachment member.

15. An elastic vibration isolation apparatus, said elastic vibration isolation apparatus comprising:
a central axis;
a first chamber, said first chamber comprising, at least in part, an elastomeric wall portion, said first chamber containing a hydraulic damping medium, and said first chamber being substantially bounded by a first peripheral wall portion substantially defining said first chamber;
a second chamber, said second chamber comprising, at least in part, an elastomeric wall portion, and said second chamber being substantially bounded by a second peripheral wall portion substantially defining said second chamber;
a substantially extended passageway interconnecting said first chamber and said second chamber, said substantially extended passageway containing an inertial column of said hydraulic damping medium, said substantially extended passageway having transverse dimensions and a length, the transverse dimensions of said inertial column of said damping medium being substantially smaller than the length of said inertial column of said damping medium;
at least one flexible membrane;
restraining means positioned adjacent to and spaced from at least one surface of said at least one flexible membrane for at least partially substantially restraining deflection of said at least one flexible membrane beyond said restraining means;
said second chamber also contains said hydraulic damping medium;
said at least one flexible membrane comprising a first flexible membrane provided on said first peripheral wall portion of said first chamber and a second flexible membrane provided on said second peripheral wall portion of said second chamber;
each of said first and second membranes having a first surface;
said restraining means comprising a first restraining member positioned adjacent to and spaced from said first surface of said first flexible membrane and a second restraining member positioned adjacent to and spaced from said first surface of said second membrane;
said first membrane having a second surface substantially opposed to said first surface of said first membrane;
said second membrane having a second surface substantially opposed to said first surface of said second membrane;
a substantially enclosed channel extending from said second surface of said first flexible membrane to said second surface of said second flexible membrane, said substantially enclosed channel containing a gas;
said substantially enclosed channel being substantially filled with the gas, the gas comprising air;
said elastic vibration isolation apparatus being for attachment to two portions of a device;
said elastic vibration isolation apparatus additionally comprising:
a central attachment member for being attached to a first of the two portions of the device;
said central attachment member having a substantially cylindrical exterior surface;
a first tube member encircling said central attachment member and spaced from said substantially cylindrical exterior surface of said central attachment member to thereby provide a first substantially annular space;
a second tube member encircling said first tube member and spaced from said first tube member to thereby provide a second substantially annular space;
partition means for dividing said second substantially annular space into said first chamber and said second chamber;
a third tube member encircling said second tube member and spaced from said second tube member thereby to provide a third substantially annular space;
said third tube member being for attachment to the second of the two portions of the device;
said first annular space comprising said substantially enclosed channel containing the gas;
said second annular space containing said hydraulic damping medium;
said third annular space comprising said substantially extended passageway containing said inertial column of said hydraulic damping medium;
at least two orifices formed in said second tube member, a first of said at least two orifices communicating with said first chamber and the second of said at least two orifices communicating with said second chamber;
a first opening formed in said first tube member and a second opening formed in said first tube member;
said first flexible membrane extending over said first opening formed in said first tube member and said second flexible membrane extending over said second opening formed in said first tube member;
said first restraining member and said second restraining member comprising surface portions of said central attachment member;
said first membrane extending over said first opening formed in said first tube member and said second membrane extending over said second opening formed in said first tube member are both, in an unflexed state, substantially spaced from said surface portions of said central attachment member;

said first and second restraining members which comprise surface portions of said central attachment member each comprising a plurality of separate and discrete projecting surfaces, said separate and discrete projecting surfaces projecting from said central attachment member spaced one from another; and said plurality of separate and discrete surfaces spaced one from another comprising raised cylindrical plateaus formed and separated by grooves provided in said substantially cylindrical surface of said central attachment member.

* * * * *

UNITED STATES PATENT AND TRADEMARK OFFICE
CERTIFICATE OF CORRECTION

PATENT NO. : 5,080,331
DATED : January 14, 1992
INVENTOR(S) : Etienne de Fontenay It is certified that error appears in the above-indentified patent and that said Letters Patent is hereby corrected as shown below:

In column 5, line 62, after 'membrane', delete "4" and insert --8--.
In column 7, line 12, after 'fibers', insert --, such as glass fibers--.

In column 8, line 27, after 'preferably', delete "vary" and insert --very--.
In column 10, line 13, after 'which', insert --is--.

Signed and Sealed this

Twenty-eighth Day of December, 1993

Attest:

BRUCE LEHMAN

Attesting Officer

Commissioner of Patents and Trademarks